Aug. 19, 1947.  W. R. HARRIS  2,426,019
WARD LEONARD CONTROL SYSTEM
Filed Nov. 10, 1944   2 Sheets-Sheet 1

WITNESSES:

INVENTOR
Walter R. Harris.
BY
Paul E. Friedemann
ATTORNEY

Aug. 19, 1947. W. R. HARRIS 2,426,019
WARD LEONARD CONTROL SYSTEM
Filed Nov. 10, 1944 2 Sheets-Sheet 2

WITNESSES:
E.A. McClosky
[signature]

INVENTOR
Walter R. Harris.
BY
Paul E. Friedemann
ATTORNEY

Patented Aug. 19, 1947

2,426,019

UNITED STATES PATENT OFFICE 2,426,019

WARD LEONARD CONTROL SYSTEM

Walter R. Harris, Forest Hills, Pa., assignor to Westinghouse Electric Corporation, East Pittsburgh, Pa., a corporation of Pennsylvania Application November 10, 1944, Serial No. 562,865

15 Claims. (Cl. 172—239)

My invention relates to control systems for electric motors and, in one of its aspects, to electric drives of variable speed for operating a machine unit in dependency upon the operation of another machine unit so as to maintain a given correlation over the available range of speeds. Such correlated drives are used, for instance, in machinery for fabricating sheet, web and strand material.

A preferred embodiment of the invention relates to a system for driving a winding or spooling unit in dependence upon the operation of a roller or calender unit. Therefore, the invention will hereinafter be described mainly in terms of such winder drives, although it should be understood that the invention is similarly applicable to other machines and apparatus requiring a correlated operation of two drives.

While the known control systems, of the general type above-referred to, operate satisfactorily under steady-state conditions, difficulties due to inertia are often encountered during accelerating and decelerating periods. That is, when adjusting the first or master drive of such a system, for instance the drive of a super-calender, to a higher or lower speed, the dependent drive, for instance of a winder, may tend to lag temporarily behind as regards the adjustment of its new speed. As a result, the tension of the material passing from the calender to the winder may be changed, thereby causing non-uniformity or telescoping of the wound-up material. During such periods of speed change, the accelerating and decelerating forces necessary to overcome the inertia of the winder may at times be greater than the tension for which the equipment is adjusted, and this may cause the tension to disappear from the material during acceleration, so that the material sags between the calender and winder. As a result, the material may be torn when the winder catches up with the calender. In some cases, torques as high as three to four times of the normal running torque are required to start the calender since static friction must be overcome. After the calender has started, these torques are not reduced instantaneously so that a rather high rate of acceleration may occur. Although this takes place for only a short time, it is also apt to make the material first sag and then suffer damage when the winder comes up to speed.

It is an object of my invention to considerably lessen or eliminate detrimental effects of the above-mentioned kind. More particularly, the invention aims at providing a control system in which a drive motor is caused to accurately maintain a desired correlation of its speed to that of another drive not only under steady-state operating conditions but also during periods of speed change.

An object, allied to the foregoing, is also to control the winder drive of a calender in dependence upon the speed, acceleration and deceleration of the calender, so that the tension of the web material passing from the calender to the winder remains within desired limits during the starting and slowing down periods of the calender.

These and other objects of my invention will be apparent from the following description of the embodiments illustrated in the drawings.

Figure 1:
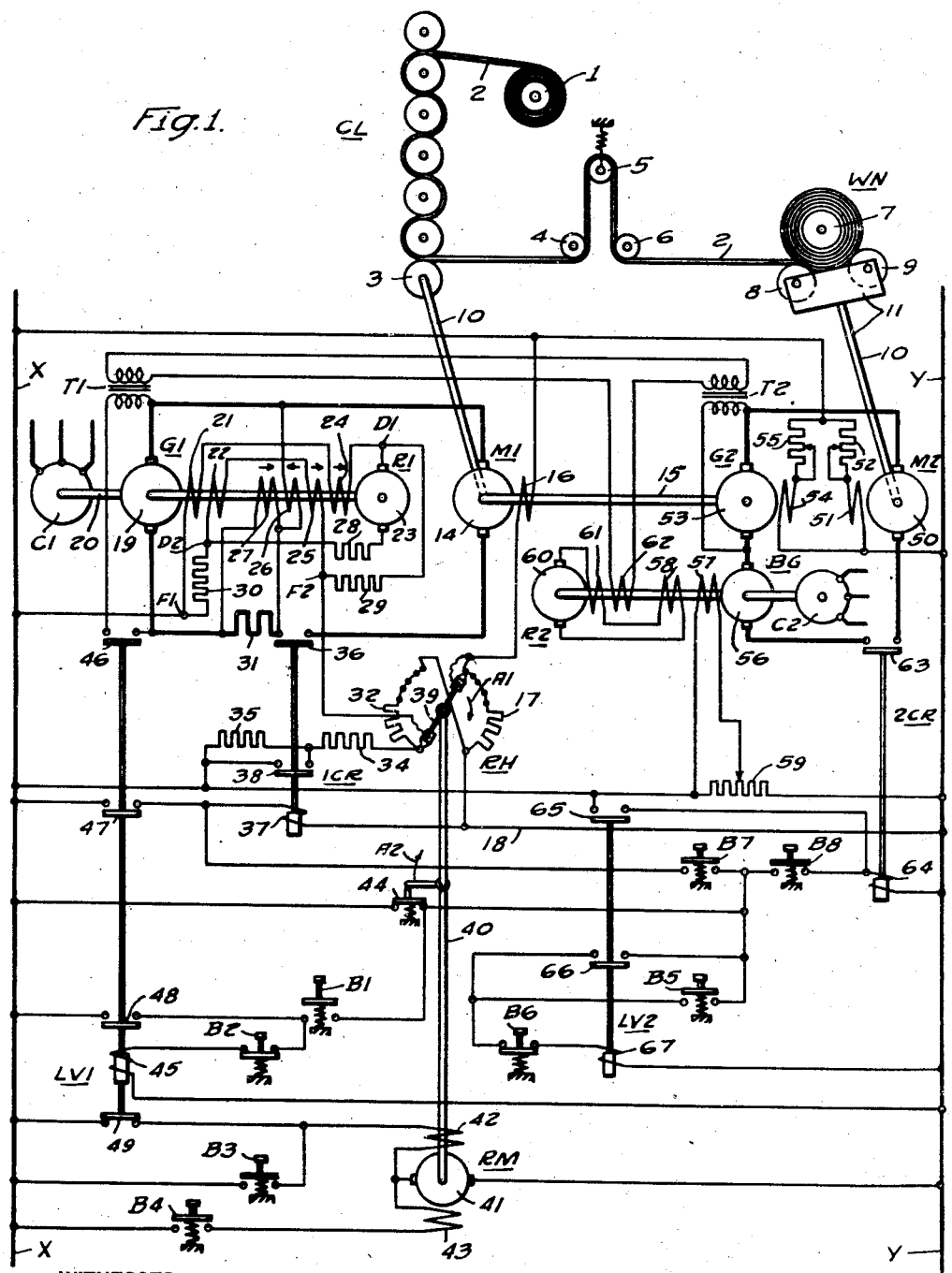
Figure 1 is a diagrammatic representation of the essential mechanical and electrical parts of a control system for operating a winder drive in correlation to a super-calender.

Referring to Figure 1, a supply reel 1 carries an amount of paper sheet wound thereon. The sheet 2 is threaded through the stack of rolls of a calender CL. The paper passes from the bottom roll 3 of the calender over a guide roller 4, a spring-biased roller 5, and another guide roller 6 onto the core 7 of a winder WN. Two rollers 8 and 9 are provided for driving the winder. The spring roller 5 serves to permit and regulate a certain amount of slack between the calender and the winder, but represents merely an auxiliary accessory as regards the present invention. That is, an intermediate spring-biased roller of this type may be omitted without affecting the operation of the control system proper.

The bottom roll 3 of calender CL is connected by a suitable mechanical transmission, here represented by a shaft 10, with a direct-current motor M1 which is energized from a variable voltage generator G1. Similarly, the drive rolls 8 and 9 of winder WN are connected by a transmission 11 with a second direct-current motor M2 energized from a generator G2.

The first motor M1 has its armature 14 connected by a shaft 15 with the generator G2, so that the direct-current voltage produced by generator G2 and fed to motor M2 is substantially proportional to the speed of motor M1, and hence to the operating speed of the calender CL. The calender motor M1 has a separately excited field winding 16 which is connected between direct-current mains X and Y, through a regulating resistor 17 and a conductor 18. The resistor 17 forms part of a control rheostat RH whose function will be described in a later place.

The generator G1 of the calender drive has its armature 19 driven through the armature shaft 20 by a motor C1 of substantially constant speed. This motor may consist of a synchronous motor energized from an alternating-current line. Two cumulatively acting field windings 21 and 22 are provided for controlling the output voltage of generator armature 19, and hence the speed of the calender motor M1. The excitation of field windings 21 and 22, also controlled by the above-mentioned control rheostat RH, is also under a regulatory control effected by a regulating generator R1 whose armature 23 is mounted on shaft 20, and hence rotates also at constant speed when the system is in operation. The regulating generator R1 is provided with four field windings denoted by 24, 25, 26 and 27, respectively. The field windings 24 and 25 are connected with each other and with the above-mentioned field windings 21 and 22 of generator G1, so as to form a bridge-type network which includes also three resistors 28, 29 and 30. This network is separately illustrated in Fig. 2.

Figure 2:
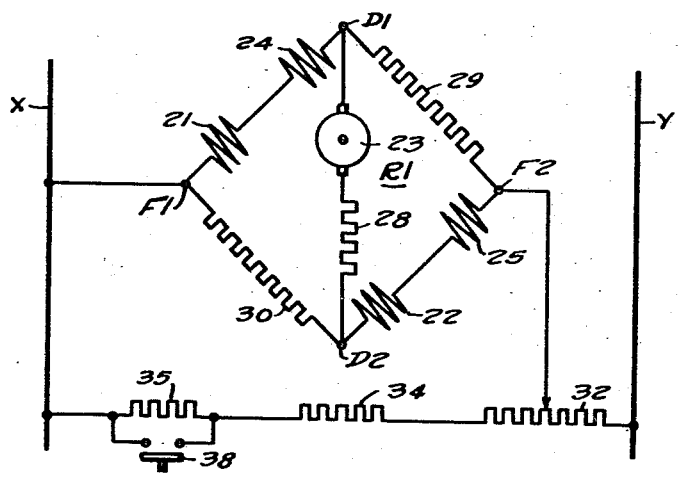
Fig. 2 is a straight-line diagram of a regulating circuit which forms part of the control system according to Fig. 1.

As apparent from Fig. 2, the armature 23 of generator R1 is series connected with resistor 28 between the output or diagonal points D1 and D2 of the bridge-type network which is supplied with energization from the direct-current mains X and Y at two feed points F1 and F2. Field winding 21 of main generator G1 of the calender drive is series connected with field winding 24 of regulating generator R1 between feed point F1 and diagonal point D1. Similarly, field winding 22 of main generator G1 is series connected with field winding 25 of regulating generator R1 between feed point F2 and diagonal point D2.

Field windings 26 and 27 of regulating generator R1 lie outside the just-mentioned bridge network (Fig. 1). Winding 26 is connected across the armature 14 of calender motor M1, and hence is energized in accordance with the voltage of the calender motor. Field winding 27 is connected across a current-measuring resistor 31, so that its field excitation is a measure of the IR drop in the circuit of the calender motor M1. Windings 26 and 27 act differentially with respect to each other and thus measure the voltage minus the IR drop so that their resultant field is proportional to the counterelectromotive force of the motor and hence the speed of motor M1.

The feed point F2 of the above-described bridge network is connected to the slider of a resistor 32 which forms part of the speed control rheostat RH. Resistor 32, in turn, is series connected with two calibrating resistors 34 and 35 between the direct-current mains X and Y, as is apparent from both Figs. 1 and 2.

The load circuit extending between the armatures of generator G1 and motor M1 is controlled by the contact 36 of a control relay 1CR whose actuating coil 37 controls also an auxiliary contact 38 connected across the calibrating resistor 35 (Fig. 1). When relay 1CR is deenergized, and the load circuit of the calender motor interrupted, the voltage across the feed points F1 and F2 of the regulator bridge network is rated in accordance with the selected calibration of resistor 35. When relay 1CR is energized, and the calender motor in operative condition, resistor 35 is shorted, so that the voltage drop between feed points F1 and F2 is decreased. The voltage value then effective depends on the slider setting of resistor 32 and can be changed down to a minimum determined by the resistance of calibrating resistor 34. The purpose of these voltage control means is to apply to the motor M1 an initial voltage higher than the normal threading voltage when the calender is started in order to break the static friction in the calender. Shortly after the starting of the calender, the motor voltage is reduced to the normal threading value in accordance with the reduced running friction of the calender.

The sliders of resistors 17 and 32 are mechanically connected, so as to form an assembly 39. This assembly is mounted on a shaft 40 which, in turn, is connected to the armature 41 of a rheostat motor RM. This motor has two field windings 42 and 43, so connected with armature 41 between mains X and Y that the motor turns the slider assembly 39 counterclockwise toward the illustrated position of lowest calender speed when winding 42 is energized. Motor RM operates in the opposite direction when winding 43 is energized, thus adjusting the rheostat RH in the direction of arrow A1 toward higher calender speeds. A limit switch 44 has its actuating member attached to shaft 40, so that the switch is closed when the rheostat RH is adjusted for lowest calender speed and is open at any other rheostat adjustment.

The control system for the calender or master drive includes a low-voltage relay LV1 whose control coil 45 serves to actuate four contacts denoted by 46, 47, 48 and 49. A damping transformer T1, whose function will be explained hereinafter, has its primary winding connected across the armature 19 of generator G1 under control by contact 46 of relay LV1. Contact 47, when relay LV1 is energized, closes the energizing circuit of coil 37 appertaining to the above-mentioned control relay 1CR. Contact 48 serves as a self-sealing contact; while contact 49, as will be explained later, secures an automatic return of the rheostat RH into the adjustment for lowest calender speed preparatory to the starting of the control system.

Four control contacts, for instance in the form of operator-controlled push buttons, are provided for controlling the operation of the calender drive. Push button B1, when depressed, causes the calender motor to start running. Button B2, when actuated, interrupts the operation and places the calender motor at rest. Button B3 serves for energizing the field winding 42, and hence for adjusting the rheostat RH toward lower speed. An over-running clutch (not shown) may be provided between armature 41 of rheostat motor RM and the slider assembly 39, so that the slider assembly is stopped when it reaches its position of lowest speed, while the motor RM may continue running. If desired, suitable limit switches (not shown) may also be chosen for disconnecting the rheostat motor RM when the rheostat slider assembly 39 has reached its end position. Button B4 serves to energize winding 43 in order to adjust the rheostat RH toward higher speeds. When either button B3 or B4 is actuated, the rheostat motor continues running at relatively low speed until the button is released. In this manner, any suitable operating speed of the calender drive can be chosen.

The above-mentioned speed adjustment and automatic speed regulation of the calender drive will be more fully understood from the following explanation which relates more in detail to the cooperation of the regulating generator R1 with the main generator G1 and the adjusting rheostat RH. As mentioned, the control of speed and acceleration of the calender motor M1 and, in consequence, the speed and acceleration control of the calender CL and the paper sheet 2 passing through the calender, is effected by varying the amount of excitation of the field windings 21 and 22 of the main generator G1. The function of the regulating generator R1 is to maintain the speed of motor M1 at a constant value corresponding to the selected adjustment of the control rheostat RH. In order to understand this regulating effect, it should be remembered that the regulating generator measures and reacts upon the speed of the calender motor and the current flowing through the field windings 21 and 22 of the generator. More in detail, the armature 23 of the regulating generator R1, being series connected, between feed points F1 and F2, with resistor 28 and regulating generator field windings 21 and 22, generates a voltage in response to the speed of motor M1 and the current flowing through the generator field windings 21 and 22. This voltage will cause a corrective current to be superimposed on that flowing through the main generator field windings 21 and 22, and this corrective current is a function of the departure of the motor speed from a predetermined value corresponding to the particular setting of the controller RH. That is, when the desired speed and load conditions obtain, the voltage generated in the armature 23 of the regulating generator R1 has the value necessary to hold the motor speed at the correct magnitude. For all other conditions, however, the voltage generated in armature 23 departs from the correct value in such a direction and by such an amount as to cause a corrective current to flow through the main field windings 21 and 22 of generator G1 thereby causing the motor M1 to return to the desired operating conditions.

Field windings 24 and 25 of the regulating generator R1 act cumulatively as regards each other. These windings are arranged to produce an effect in the same direction as the effect produced by field winding 27 and, therefore, they oppose, or are differentially related to, the effect of field winding 26 of the regulator generator.

Windings 24 and 25 serve the double purpose of providing together both a self-energized field and a pattern field. The current flowing to these windings from mains X and Y serve as a pattern excitation, and through the regulator action the motor speed is held proportional to this component of current. The component of current flowing through windings 24 and 25 due to the voltage generated by the armature 23 acts as the self-energizing portion of excitation, and resistor 28 is adjusted so that the resistance line of the bridge circuit including armature 23 and resistor 28 in series with the parallel branches D1—F1—D2 and D1—F2—D2 is substantially coincident with the no-load saturation curve caused by windings 24 and 25.

Since windings 24 and 25 are connected in series with the main generator field windings 21 and 22, respectively, any change in current which flows through the main generator field windings 21 and 22 is immediately reflected in the voltage generated by the armature 23 of the regulator generator so that the system is substantially free of hunting.

By virtue of the above-described functioning, there is always a certain relationship between the operation of motor M1 and the corrective effect caused thereby in altering the flow of current through the main field windings of generator G1. As a result, the speed of the motor is maintained at a predetermined value corresponding accurately to the selected setting of the control rheostat RH.

Referring now to the dependent or winder drive according to Fig. 1, the armature 50 of the winder motor M2 is acted upon by a field winding 51 which receives constant excitation through a calibrating resistor 52 from direct-current mains X and Y. Consequently, the speed of the winder motor, as mentioned before, is in accordance with the voltage impressed across the armature 50. This voltage is mainly generated in the armature 53 of the main generator G2 of the winder drive system. The field winding 54 of the generator G2 is excited from mains X and Y through a calibrating resistor 55, so as to obtain constant excitation during the operation of the system. Consequently, the output voltage of armature 53 is determined by the speed of rotation which, in turn, is proportional to the speed of the calender drive.

The load circuit of the second drive system, including in series the armatures 50 and 53, passes also through the armature 56 of a booster generator BG which is driven at substantially constant speed, for instance, by a synchronous motor C2 energized from the above-mentioned alternating-current line. The booster generator serves to supply the resistance drop in the armature circuit and leads of the winder generator and winder motor, and has also the function of superimposing on this circuit an inertia compensating control. The booster generator BG is provided with two separately excited field windings 57 and 58. Winding 57 is excited by a constant voltage derived from an adjustable potentiometer rheostat 59 which, in turn, is energized from mains X and Y. With potentiometer 59 properly adjusted, the same current is caused to circulate through the armature circuit of the winder drive at all steady-state operating speeds of the equipment.

Field winding 58 of booster generator BG receives its energy from a second regulating generator R2 whose armature 60 is mounted on the shaft of the booster generator BG, so as to operate also at constant speed. The regulating generator R2 has a self-excited field winding 61 connected in series with armature 60 and field winding 58. The main control winding 62 of regulating generator R2 is connected to the secondary of the above-mentioned damping transformer T1. A second damping transformer T2 has its primary connected across armature 53 of the main generator G2 of the second drive system, and the secondary of transformer T2 is also series connected with winding 62 of generator R2.

The armature circuit of the winder drive system is under control by the contact 63 of a control relay 2CR whose operating coil is denoted by 64. The control devices for the winder drive system include further a low-voltage relay LV2 with two contacts 65 and 66 controlled by a coil 67. Four control contacts, such as operator-actuable push buttons B5, B6, B7 and B8, are connected with relays 2CR, LV2 and lCR. Button B5, when depressed, puts the winder drive in operation, while button B6 serves to stop the operation. Button B7 permits an inching operation of the calender, while button B8 permits inching of the winder drive.

The self-excited field winding 61 of regulating generator R2 has the resistance of its circuit, including that of armature 60 and field winding 58, so adjusted that it is approximately in accordance with, or slightly above, the no-load saturation curve, so that under steady-state conditions, the armature 60 will generate no voltage and will exert no effect on the field winding 58 of the booster generator BG. The field winding 62 of regulator R2 is likewise without excitation as long as the speeds in both correlated drives remain constant, so that no impulse is induced in the secondaries of transformers T1 and T2. Therefore, under steady-state conditions, the voltage imposed on motor M2 is mainly generated by generator G2 and corrected, as to the IR drop in the armature circuit, by means of the booster generator BG and in accordance with the setting of potentiometer 59. During periods of acceleration and deceleration, these periods being tantamount to periods of increasing and decreasing voltage, a voltage is produced in the circuit of field winding 62 in dependence upon the rate of speed of voltage change in the two drive systems. This temporary excitation causes regulating generator R2 to supply excitation to field winding 58 of booster generator BG, with the tendency to compensate the driving voltage of the winder motor M2 for speed differences caused between the two drives by the difference in inertia.

The operation of the illustrated system, as a whole, will now be understood from the following summarizing review. The supply of energization to mains X and Y causes the field winding 42 of rheostat motor RM to be energized through contact 49 of relay LV1. Hence, the slider assembly 39 of rheostat RH is rotated into the illustrated position of slowest calender speed. Before this position is reached, the limit switch 44 is open, so that the calender drive can not be started. Properly adjusted for starting conditions, the limit switch 44 permits operating the system by preparing the circuit for the start button B1. When ths button is depressed, coil 45 of the relay LV1 is energized in circuit X, 44, B1, B2, 45, Y. As a result, relay LV1 places transformer T1 in operative condition by closing the contact 46, and also supplies excitation to coil 37 of relay lCR, so that the armature circuit of the calender drive system is closed at 36. Simultaneously, relay LV1 closes a self-holding circuit at contact 48, so that it remains picked up after the release of the starting button B1 and is caused to drop off only when the stop button B2 is actuated or when the voltage between mains X and Y drops below a safe value. Due to the closure of contact 36 and the short-circuiting of resistor 35 at contact 38, the calender drive is now in operating condition. Assuming that the auxiliary motors C1 and C2 were started when energizing the mains X and Y, motor M1 will now run at its threading speed and the sheet 2 can be threaded between the calender rolls and over rolls 4, 5 and 6 to the winder WN. The winder drive may then be started by pushing the button B5. This causes coil 67 of relay LV2 to be energized in circuit Y, 67, B6, B5, 44, X. Relay LV2 closes its self-holding contact 66 and hence remains picked up after the release of button B5. Consequently, the winder drive is stopped only by actuating the button B6 or upon the occurrence of voltage failure between mains X and Y. Relay LV2, at contact 65, energizes coil 64 of relay 2CR, thereby closing contacts 63, so that the armature circuit of the winder drive system is now also in operation, and causes the motor M2 to run at the proper speed relative to that of the calender drive.

Any necessary speed or position adjustment can be made by actuating the inching buttons B7 and B8. When button B7 is actuated, relay lCR is closed as long as the button remains depressed, provided the rheostat RH is set for lowest speed so that contact 44 is closed. In this manner, the calender or sheet can be advanced any desired amount. Similarly, the control relay 2CR of the winder drive can be actuated by depressing the button B8 any desired length of time, thereby advancing at lowest (threading) speed.

As mentioned before, the regulating generator R2 is without effect on the winder drive during steady-state operating conditions, and becomes effective only during periods of speed change. A more detailed explanation of this effect will now be given.

The transformer T2 across the main generator G2 of the winder drive measures the rate of change of the winder voltage, so that the voltage applied to the control field 62 of the regulating generator R2 is directly proportional to the rate of change of the winder speed. This causes the regulating generator to change the excitation of booster field winding 58, and hence also the voltage generated across armature 56. In consequence, higher currents are caused to flow in the armature circuit of the winder generator and winder motor during acceleration periods, while lower currents are maintained during deceleration periods. These currents can be adjusted for a value necessary to overcome the inertia of the drive system during acceleration and deceleration, and thus are in the direction necessary for maintaining the sheet tension constant during these changes.

As described above, contact 46 of relay LV1, which is used to start the equipment, is in series with the primary of damping transformer T1. This arrangement compensates for the high rates of acceleration during starting as follows. Let us assume that relay 2CR is closed and that the booster BG is circulating current through the armature circuits of the winder motor and winder generator so as to cause normal tension in the sheet between the calender and the winder. When the start push button B1 is depressed to start the calender, relay LV1 is energized and acts to start the calender through contactor lCR while simultaneously closing the contact 46 in the primary circuit of damping transformer T1. Thus a voltage is suddenly applied to the primary of the damping transformer thus causing a current to flow in the secondary and in the regulator field winding 62. Through this action, which is at a maximum rate because the contactor is suddenly closed on an existing voltage, higher currents are called for in the winder motor armature which tends to make it accelerate in step with the calender. After starting and during normal acceleration, the damping transformer T1 aids the damping transformer T2 in changing the regulator field to effect inertia compensation. Thus the transformer T2 across the winder generator can be smaller, due to use of transformer T1.

While I have described a specific and detailed embodiment in the foregoing, it will be understood that my invention permits various modifications, especially as regards the details of its individual units or sections. For instance, the above-described control and regulation of the master or calender drive is presented mainly as a preferred means of achieving a control of high accuracy. However, the details of the master drive and its control and regulation are not essential for my invention, and may be changed or replaced by a variable voltage drive system of different design. Another modification, within the principles of my invention, is to eliminate one of the two generators BG or R2 by placing the armature of the inertia controlled regulating generator immediately into the armature circuit of the main generator and drive motor of the second drive system. A simplified system of the latter type may be chosen in cases where the driving energy of the second drive is relatively small, so that the control need not include as large an amplification factor as the use of tandem operated booster and regulating generators according to Fig. 1. The just-mentioned possibilities of modification will be apparent from the embodiment illustrated in Fig. 3.

Figure 3:
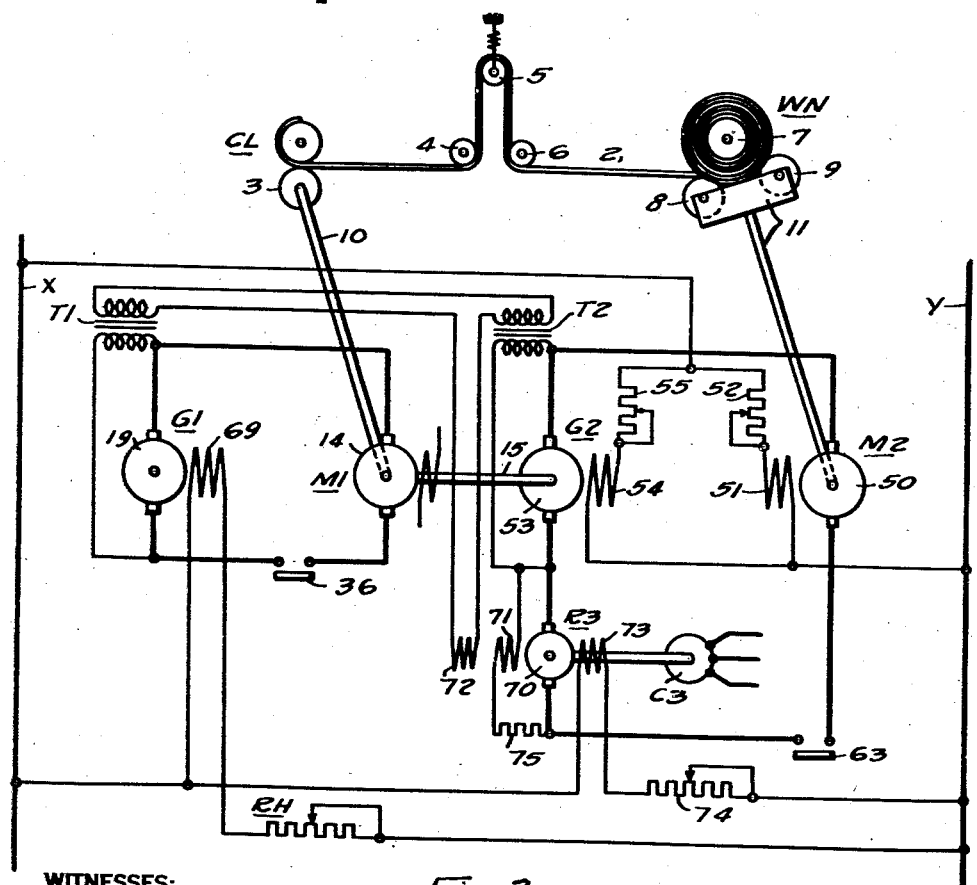
Fig. 3 is a diagrammatic showing of a second embodiment of the invention, also representing correlated calender and winder drives.

Fig. 3 shows a calendar CL and a winder WN of a machine which, though shown more schematically, may be similar to the one indicated in Fig. 1. The bottom roll 3 of the calender is driven by a motor M1 which is energized from a first main generator G1. A damping transformer T1 has its primary connected across the armature 19 of generator G1. The drive system of the calender is operative upon the closure of a contact 36 which may form part of a relay arrangement of the type shown in Fig. 1. The voltage generated by armature 19 and impressed on motor M1 is controlled by means of a shunt field winding 69 on the generator G1. This winding derives its excitation from mains X and Y through a speed adjusting rheostat RH.

The drive motor M2 of the winder core 7 is energized from a main generator G2. The motor field winding 51, as in the example of Fig. 1, obtains constant excitation from mains X and Y through an adjusting rheostat 52. The armature 53 of generator G2 is driven through a transmission 15 by armature 14 of motor M1, and is acted upon by a field winding 54, excited by constant voltage from mains X and Y through field winding 55. A damping transformer T2 is primarily connected across armature 53 while its secondary is series connected with that of transformer T1. The armature circuit of the winder drive is under control by a contact 63 which may form part of a control relay corresponding to relay 2CR in Fig. 1.

Regulating generator R3 has its armature 70 series connected in the armature circuit of generator G2 and motor M2. The generator R3 is driven at constant speed by an auxiliary motor C3, and has three field windings denoted by 71, 72 and 73. Field winding 73 is supplied with constant excitation from mains X and Y through an adjusting rheostat 74, and corresponds as to its essential function to the field winding 57 of booster generator BG shown in Fig. 1. That is, the excitation of field winding 73, according to Fig. 3, is to generate a booster voltage across armature 70 which compensates for the IR drop in the armature circuit of drive motor M2. Field winding 71 is a self-excited shunt-type winding and is connected across armature 70 through a calibrating resistor 75. The circuit of the self-excited winding 71 is so chosen that its resistance line is substantially coincident with, or somewhat above, the no-load saturation characteristic of the appertaining motor field. Hence, this winding has an amplifying effect by feeding a part of the regulator output energy back into regulator field excitation, in order to produce still more output energy. In other words, the function of this winding is the same as that of winding 61 in Fig. 1, despite the difference in circuit connection. The winding 71 tends to maintain the output voltage of armature 70 at the value adjusted by the control effect of the two other windings 72 and 73, but in itself is incapable of building up generator voltage.

Field winding 72 is connected with the secondary circuit of the transformers T1 and T2, and hence has the same control effect as winding 62 in the system according to Fig. 1. When the calender and winder drives operate at constant speed, the only control effect in the field means of regulator R3 is that produced by the compensating field winding 73. Only during periods of acceleration or deceleration are voltages induced in the transformers T1 and T2 and hence corrective control effects obtained in the regulator R3.

Other modifications and changes than those referred to above will be available to those skilled in the art upon a study of the foregoing disclosure. I therefore wish this disclosure to be understood as illustrative, and as to the scope and essential features of my invention, refer to the definitions thereof contained in the claims attached hereto.

I claim as my invention:

1. An electric drive system comprising a direct-current motor, a direct-current main generator connected with said motor for supplying energization thereto, means for driving said main generator at adjustable speed in order to operate said motor at a corresponding speed, circuit means for controlling said energization in dependence upon the rate of speed change of said main generator in order to cause said energization to increase at a controlled rate during acceleration and decrease at a controlled rate during deceleration of said main generator, said circuit means including an amplifying regulating generator having an armature for providing reversible voltage for varying said energization and having field means for controlling said voltage, and transformer means forming part of said circuit means and having a primary circuit connected with said field means for exciting them in dependence upon the rate of speed change of said main generator.

2. A control system for correlating the operation of two variable speed drives, comprising a first drive having a first motor and a first generator for energizing said motor, a second drive having a second motor and a second generator connected with said first drive so as to operate at a speed dependent upon that of said first drive for supplying corresponding energization to said second motor, control means disposed for varying said latter energization during accelerating and decelerating periods and including a regulating generator having an armature circuit for regulating the energization of said second motor and field means for controlling the voltage of said armature circuit, first measuring means connected with said first generator for producing a voltage component in accordance with the rate of speed change of said first generator, and second measuring means connected with said second generator for producing a voltage component in accordance with the rate of speed change of said second generator, said field means being connected to said first and second measuring means so as to cause the energization of said second motor to increase and decrease during periods of acceleration and deceleration respectively of said first drive.

3. A control system for correlating the operation of two variable speed drives, comprising a first drive having a first motor and a first generator for energizing said motor, a second drive having a second motor and a second generator connected with said first drive so as to operate at a speed dependent upon that of said first drive for supplying corresponding energization to said second motor for increasing and decreasing said latter energization during acceleration and deceleration respectively of said first drive, said control means comprising a regulating generator having an armature circuit regulating said latter energization and a field circuit for controlling said armature circuit, and a transformer primarily connected with said first generator and secondarily connected with said field circuit for exciting the latter in dependence upon the rate of voltage change of said first generator.

4. A control system for correlating the operation of two variable speed drives, comprising a first drive having a first motor and a first generator for energizing said motor, a second drive having a second motor and a second generator connected with said first drive so as to operate at a speed dependent upon that of said first drive for supplying corresponding energization to said second motor, a booster generator having an armature connected with said second generator and second motor for varying the energization of said second motor, a regulating generator connected with said booster generator to provide variable field excitation therefor, and two transformers primarily connected with said first and second generators respectively for producing output voltages in dependence upon the rate of voltage change of said respective generators, said two transformers being secondarily connected to said regulating generator.

5. A control system for operating a winder drive in correlation to the operation of a master drive, comprising a winder drive direct-current motor, a main generator connected to said motor for providing energization therefor, means for driving said main generator at a speed varying in dependence upon that of said master drive so that the voltage of said energization varies accordingly, another generator series connected with said main generator and motor for modifying said voltage during periods of speed change of said main drive, and control means for controlling the excitation of said other generator in dependence upon the rate of speed change of said master drive so as to increase and decrease said voltage when the speed of said master drive increases and decreases respectively.

6. A control system for operating a winder drive in correlation to the operation of a master drive, comprising a winder drive direct-current motor, a main generator connected to said motor for providing energization therefor, means for driving said main generator at a speed varying in dependence upon that of said master drive so that the voltage of said energization varies accordingly, a constant speed generator connected with said main generator for modifying said voltage during periods of speed change of said main drive, field means on said latter generator, and exciting means connected with said field means and operative in dependence upon the rate of speed of change of said master drive so as to increase and decrease said voltage when the speed of said master drive increases and decreases respectively.

7. A control system for operating a drive motor in dependence upon the operation of a master drive, comprising speed controlling variable voltage means for each of said motors, the variable voltage means of said drive motor being interlinked with said master drive so as to energize said motor by a voltage substantially dependent on that of said other variable voltage means, voltage modifying control means connected with said variable voltage means of said drive motor and comprising measuring means connected with said other variable voltage means so as to vary the motor voltage in dependence upon the rate of voltage change of said other variable voltage means, whereby the motor voltage is increased and decreased during periods of voltage increase and decrease respectively of said other variable voltage means.

8. A control system for correlating the operation of two variable speed drives, comprising a first drive and variable voltage means for energizing said drive, a second drive having a motor, a main generator and a booster generator series connected with said motor, means for driving said main generator at a speed varying in accordance with that of said first drive for causing said motor to run at a speed dependent upon that of said first drive, said booster generator having field winding means, adjustable circuit means connected with said field winding means to provide therefor a component exciting voltage of a selective constant magnitude, regulating apparatus having an output circuit connected to said field winding means to provide therefor a component exciting voltage of variable magnitude, said regulating apparatus having a control circuit disposed for controlling said variable component voltage, and control means connected with said variable voltage means for controlling said control circuit in dependence upon the rate of voltage change of said variable voltage means so as to cause said booster generator to increase the energization of said motor during acceleration and decrease it during deceleration of said first drive.

9. A control system for correlating the operation of two variable speed drives, comprising a first drive and variable voltage means for energizing said drive, a second drive having a motor, a main generator and a booster generator series connected with said motor, means for driving said main generator at a speed varying in accordance with that of said first drive for causing said motor to run at a speed dependent upon that of said first drive, said booster generator having field winding means, adjustable circuit means connected with said field winding means to provide therefor a component exciting voltage of a selective constant magnitude, regulating apparatus having an output circuit connected to said field winding means to provide therefor a component exciting voltage of variable magnitude, said regulating apparatus having a control circuit disposed for controlling said variable component voltage, two transformers connecting said control circuit with said variable voltage means and said main generator respectively for exciting said control circuit in dependence upon the rate of voltage change of said variable voltage means and main generator, whereby said booster generator is caused to increase the energization of said motor during acceleration and decrease it during deceleration of said first drive.

10. A control system for correlating the operation of two variable speed drives, comprising a first drive and variable voltage means for energizing said drive, a second drive having a motor, a main generator and a booster generator series connected with said motor, means for driving said main generator at a speed varying in accordance with that of said first drive for causing said motor to run at a speed dependent upon that of said first drive, said booster generator having two field windings, adjustable circuit means connected with one of said field windings to provide therefor a constant excitation of selective magnitude, a regulating generator having an armature connected to said other field winding and a regulating field winding for controlling the output voltage of said armature, and transformer means connected with said regulating field winding and at least one of said drives so as to be energized in dependence upon the rate of voltage change of said drives, whereby said booster generator is caused to increase and decrease the voltage across said motor during periods of acceleration and deceleration respectively of said drives, and means for driving said booster generator and regulating generator at substantially constant speed.

11. A control system for operating a winder drive in correlation to the operation of a master drive, comprising a winder drive direct-current motor, a main generator having a separately excited field winding on an armature, said armature being connected to said motor for providing energization therefor, means for driving said main generator at a speed varying in dependence upon that of said master drive so that the voltage of said energization varies accordingly, another generator series connected with said armature and motor for modifying said voltage during periods of speed change of said main drive, transformer means for controlling the excitation of said other generator in dependence upon the rate of speed change of said master drive so as to increase and decrease said voltage when the speed of said master drive increases and decreases respectively, circuit means for supplying exciting current to said main generator field winding, and a voltage responsive relay connected with said circuit means for controlling said control means so as to render it ineffective when the voltage of said circuit means is below a given magnitude.

12. A control system for correlating the operation of two variable speed drives, comprising a first drive and variable voltage means for energizing said drive, a second drive having a motor, a main generator and a booster generator series connected with said motor, means for driving said main generator at a speed varying in accordance with that of said first drive for causing said motor to run at a speed dependent upon that of said first drive, said booster generator having two field windings, adjustable circuit means connected with one of said field windings to provide therefor a constant excitation of selective magnitude, a regulating generator having an armature connected to said other field winding and a regulating field winding for controlling the output voltage of said armature, a transformer connected between said regulating field winding and said variable voltage means for exciting said regulating field winding in dependence upon the rate of voltage change of said variable voltage means so as to cause said booster generator to increase and decrease the voltage across said motor during accelerating and decelerating periods respectively of said first drive, separately excited field windings disposed on said main generator and motor respectively, circuit means connected with said separately excited field windings, and a voltage responsive relay connected with said circuit means for rendering said regulating field winding ineffective when the voltage of said circuit means is below a given magnitude.

13. With a drive system having first means operable at adjustable speed and second means to be driven in a desired speed relation to said first means, the combination of a direct-current motor connected to said second means for driving the latter, a direct-current main generator mechanically connected to said first means to be driven in proportion to the adjusted speed of the latter and electrically connected to said motor for supplying it with speed-responsive energizing voltage, electric means for measuring the rate of speed change of said generator, and a regulating generator controlled by said measuring means and connected with said main generator for varying said voltage so as to increase it during acceleration and decrease it during deceleration of said main generator.

14. With a drive system having first means operable at adjustable speed and second means to be driven in a desired speed relation to said first means, the combination of a direct-current motor connected to said second means for driving the latter, a direct-current main generator mechanically connected to said first means to be driven in proportion to the adjusted speed of the latter and electrically connected to said motor for supplying it with speed-responsive energizing voltage, a booster generator having an armature series connected with said main generator and motor for varying said voltage, a regulating generator connected with said booster generator to provide variable field excitation therefor, and circuit means for controlling said regulating generator in dependence upon the rate of speed change of said main generator in order to cause said voltage to change at an increased rate during acceleration and to decrease at an increased rate during deceleration of said main generator.

15. With a drive system having first means operable at adjustable speed and second means to be driven in a desired speed relation to said first means, the combination of a direct-current motor connected to said second means for driving the latter, a direct-current main generator mechanically connected to said first means to be driven in proportion to the adjusted speed of the latter and electrically connected to said motor for supplying it with speed-responsive energization, a booster generator having an armature series connected with said main generator and motor for varying said energization, a regulating generator connected with said booster generator to provide variable field excitation therefor and transformer means having a primary circuit connected with said main generator and a secondary circuit connected with said regulating generator for providing field excitation for the latter in dependence upon the rate of speed change of said main generator in order to cause said energization to increase during acceleration and decrease during deceleration of said main generator.

WALTER R. HARRIS.

REFERENCES CITED

The following references are of record in the file of this patent:

UNITED STATES PATENTS

| Number | Name | Date |
|---|---|---|
| 1,717,823 | Whiting | June 18, 1929 |
| 1,717,293 | Winter | June 11, 1929 |
| 2,082,816 | Adams et al. | June 8, 1937 |
| 2,168,777 | McCreary | Aug. 8, 1939 |
| 2,325,381 | Edwards et al. | June 27, 1943 |
| 2,341,505 | Linn | Feb. 8, 1944 |